United States Patent [19]

Ogasawara

[11] Patent Number: 4,888,766
[45] Date of Patent: Dec. 19, 1989

[54] MULTI-TERMINAL CONTROL SYSTEM
[75] Inventor: Fumihiro Ogasawara, Yamato, Japan
[73] Assignee: Ricoh Company, Ltd., Tokyo, Japan
[21] Appl. No.: 193,600
[22] Filed: May 13, 1988
[30] Foreign Application Priority Data
  May 13, 1987 [JP] Japan .................. 62-114819
[51] Int. Cl.$^4$ .............................................. H04J 3/12
[52] U.S. Cl. .................... 370/95.1; 370/110.1
[58] Field of Search .................. 370/110.1, 85, 95, 94, 370/89; 340/825.5, 825.51

[56] References Cited
U.S. PATENT DOCUMENTS

| Re. 28,577 | 10/1975 | Schmidt | 370/95 |
|---|---|---|---|
| 4,434,486 | 2/1984 | Barner | 370/110.1 |
| 4,603,418 | 7/1986 | Townsend | 370/95 |
| 4,627,047 | 12/1986 | Pitroda et al. | 370/110.1 |
| 4,630,261 | 12/1986 | Irvin | 370/95 |

Primary Examiner—Douglas W. Olms
Attorney, Agent, or Firm—Oblon, Spivak, McClelland, Maier & Neustadt

[57] ABSTRACT

A communication control method of a communication system including a network, such as an ISDN network, and a plurality of main interconnection buses connected to the network through respective connecting units. A plurality of terminal apparatuses are operatively connected to each of the main interconnection buses. Each bus is provided with a signal channel, which is shared by the plurality of terminal apparatuses connected to the bus for call connection with the network, and at least one information channel for transmission of information in a multiplex format. In accordance with the principle of the present invention, when all of the information channels are occupied or in use, the signal channel is temporarily used as an additional information channel to thereby allow the other terminal apparatuses to carry out transmission of information.

3 Claims, 4 Drawing Sheets

MULTI-TERMINAL CONTROL SYSTEM

BACKGROUND OF THE INVENTION

1. Field of the Invention

This invention generally relates to a system for controlling the connection condition of a plurality of terminals and in particular to a multi-terminal control system for controlling the connection condition of a plurality of data communication terminals connected to a communication path of the bus type in which signal and information channels are multiplexed.

2. Description of the Prior Art

Recently, there has been developed an Integrated Services Digital Network or simply ISDN, which is economical, high in quality and capable of providing a variety of services, by providing a digital communication network, such as telephone network, including a subscriber communication system, and its standardization process is being carried out by CCITT. The connection format between the network and a user's terminal apparatus in ISDN is of the bus type, and in accordance with the current CCITT recommendations, the user/network interface in ISDN has two kinds of interfaces, i.e., basic interface and primary group interface.

In the basic interface, up to eight terminal apparatuses can be connected to a single bus. Besides, the single bus is multiplexed with two B channels (64 K bps), each defining an information channel, and one D channel (16 K bps), which defines a signal channel for controlling a call connection with the network or the like. The two information channels may be used as a single information channel of 128 K bps, and the D channel may also be used as an information channel with some limitations. An example of the structure at the user side when use is made of the basic interface is illustrated in FIG. 4. That is, as shown in FIG. 4, a main interconnection bus MB1, MB2 is connected at the user side of each of network end terminal apparatus NT1, NT2 which provides the basic interface for connecting a terminal apparatus to the network in ISDN. To the main interconnection bus MB1 are connected two Group 4 facsimile machines (hereinafter, simply referred to as facsimile machines) GF11 and GF12 and a digital telephone unit DT1 through sockets ST11, ST12 and ST13, respectively. Similarly, to the main interconnection bus MB2 are connected two facsimile machines GF21 and GF22 and a digital telephone unit DT2 through sockets ST21, ST23 and ST22, respectively. It is to be noted that up to eight such ISDN terminal apparatuses may be connected to each of the main interconnection buses MB1 and MB2. It should also be noted that each of the main interconnection buses MB1 and MB2 is physically a four line transmission path with two circuits for transmission and reception, in which two information channels B1 and B2 (B channel) and one signal channel D are multiplexed.

For example, in the case where image information is to be transmitted from the facsimile machines GF11 to the facsimile machine GF21, in the first place, the facsimile machine GF11 must obtain the right of access to the signal channel D. And, using this signal channel D, the facsimile machine GF11 sends a request for connection to a destination to the network using the information channel B1 or B2. In this case, if the information channel B1 or B2 is not used by another terminal apparatus connected to the main interconnection bus MB1 and moreover the destination facsimile machine GF21 is not in communication, the network establishes a connection between the facsimile machines GF11 and GF21. And, thereafter, a predetermined Group 4 facsimile communication procedure is executed between the facsimile machines GF11 and GF21 so as to carry out transmission of image information. Upon completion of transmission of image information, the facsimile machine GF11 sends a request of call disconnection to the network, so that the transmission paths of facsimile machines GF11 and GF21 to the network are disconnected.

In the above-described basic interface, the maximum number of terminal apparatuses which may be connected to a single main interconnection bus is eight and there are provided only two information channels for each main interconnection bus, and thus, there is a case in which both of the two information channels are in use when one of the terminal apparatuses has requested a call connection to the network. In such a case, the terminal apparatus which has requested a call connection must wait until the data transmission of the terminal apparatus using these information channels is completed.

SUMMARY OF THE INVENTION

In accordance with the principle of the present invention, there is provided a multi-terminal communication control system in which transmission of information is carried out using a signal channel if an information channel is occupied or closed. That is, the present communication control system includes a plurality of data communication terminal apparatuses connected to a transmission path of a bus type in which signal and information channels are multiplexed. Normally, the information channel is used for transmission of information; however, if the information channel is in use or closed, the signal channel is used for transmission of information in place.

It is therefore a primary object of the present invention to obviate the disadvantages of the prior art as described above and to provide an improved data communication system and method.

Another object of the present invention is to provide an improved multi-terminal data communication system including a plurality of terminal apparatuses connected to the same transmission line.

A further object of the present invention is to provide an improved communication control method and system high in efficiency.

Other objects, advantages and novel features of the present invention will become apparent from the following detailed description of the invention when considered in conjunction with the accompanying drawings.

DESCRIPTION OF THE PREFERRED EMBODIMENTS

Figure 1:
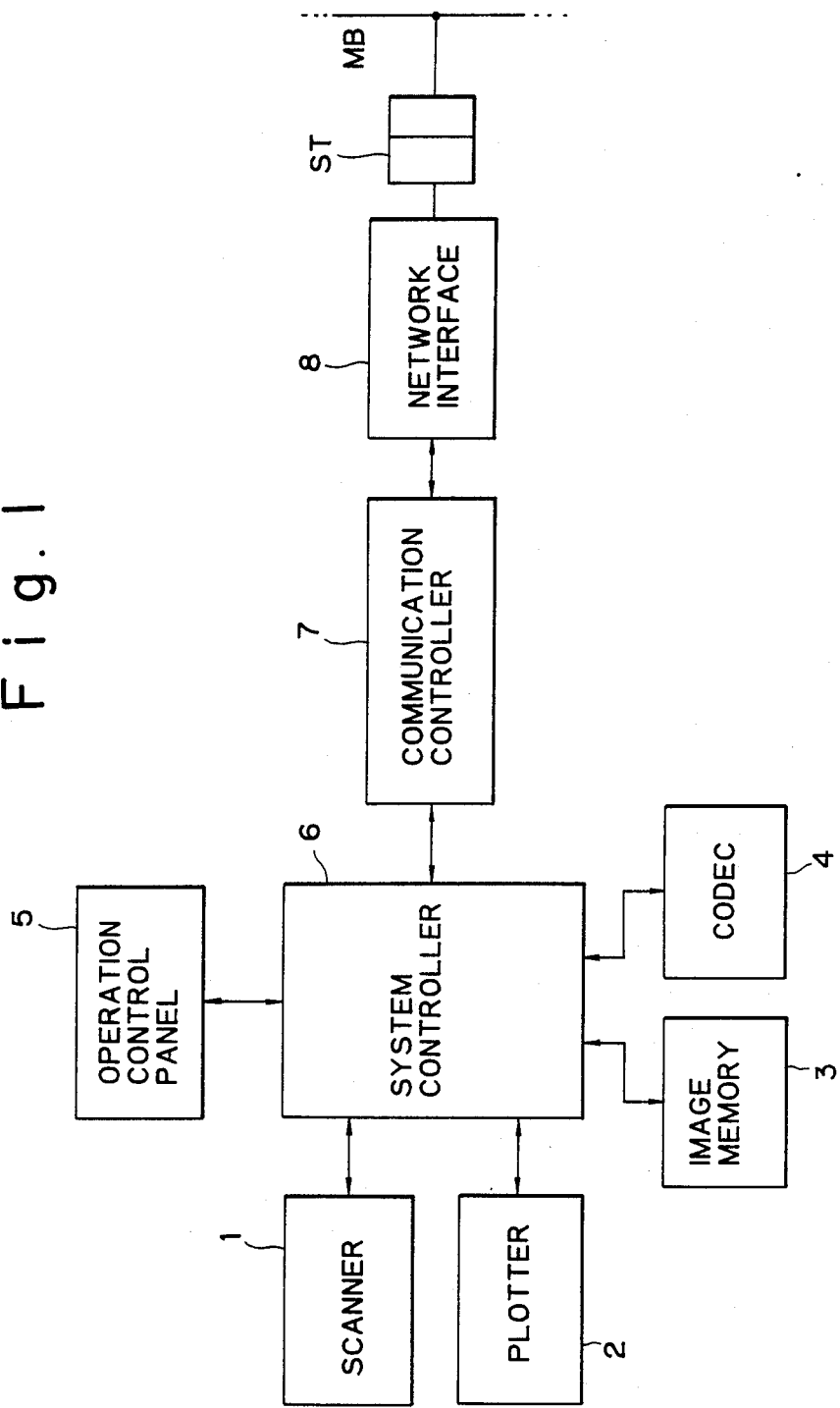
FIG. 1 is a block diagram showing a Group 4 facsimile machine constructed in accordance with one embodiment of the present invention.
Figure 4:
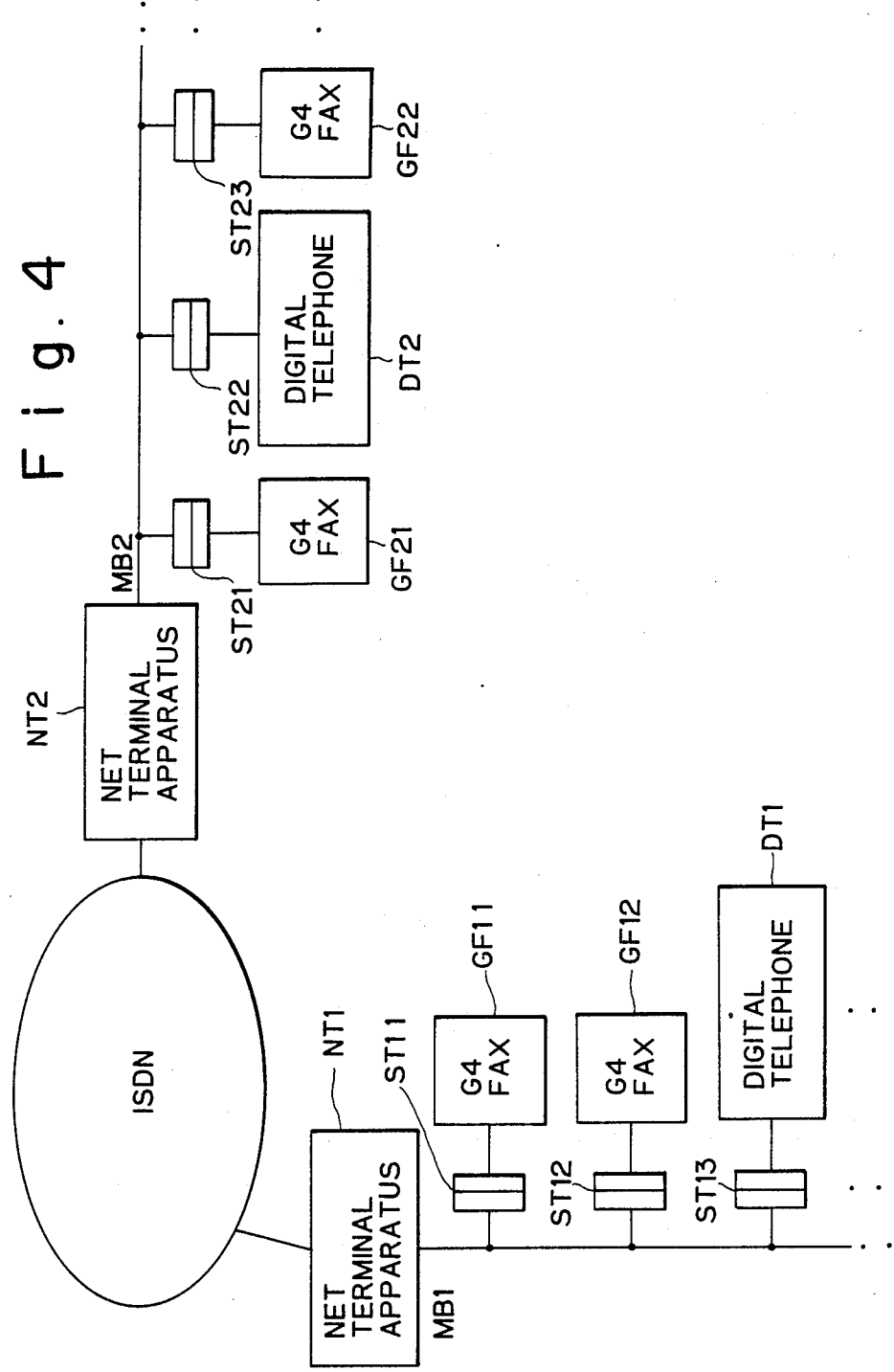
FIG. 4 is a schematic illustration showing the overall structure of ISDN.

Referring now to FIG. 1, there is shown in block form a Group 4 facsimile machine constructed in accordance with one embodiment of the present invention. Similarly with the Group 4 facsimile machine shown in FIG. 4, this Group 4 facsimile machine uses ISDN (hereinafter, simply referred to as network) as a transmission path and it is assumed to be connected to the basic interface. In FIG. 1, the present facsimile machine includes a scanner 1 for optically reading an original image at a predetermined resolution, a plotter 2 for recording image information on a recording medium at a predetermined resolution, an image memory 3 for temporarily storing image information, and a codec 4 for compressing image information by coding and decompressing image information by decoding. It is to be noted that image information is stored in the image memory 3 in a compressed format. Also provided is an operation/display unit 5 which is provided with various operational keys and displays and which serves as an interface between the operator and the facsimile machine. Also provided is a system controller 6 which provides an overall control of the present facsimile machine. In addition, a communication control unit 7 is provided for providing a transmission control for using the network as a transmission path and a transmission control at the time of transmission of image information by the Group 4 facsimile machine. A network interface 8 is also provided for connecting the present Group 4 facsimile machine to the network and it is operatively coupled to a main interconnection bus MB through a socket ST.

Figure 2:
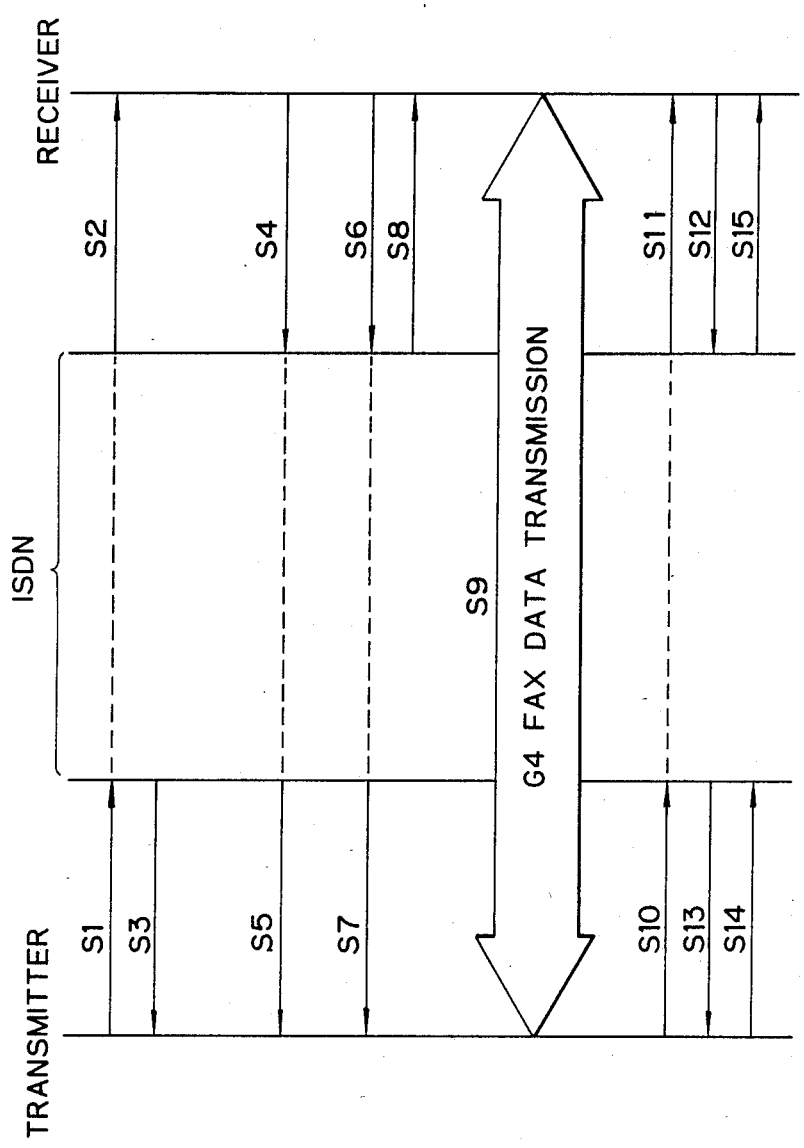
FIG. 2 is a time chart schematically showing a communication procedure between a network and the terminal apparatus shown in FIG. 1.

With the above-described structure, in the case where data transmission is to be carried out between Group 4 facsimile machines, in the first place, as shown in FIG. 2, a calling machine sends a call establishment message S1 to the network using a signal channel D to thereby request to establish a communication path with a destination station. It is to be noted that, in the following description, transmission of messages regarding communication control procedure between calling or called machine and the network is carried out using the signal channel D. In response to the call establishment message S1, the network connects the calling station to the information channel B (or D) and sends a call establishment message S2 to the called machine. In addition, the network sends a call establishment reception message S3, which indicates the initiation of processing of the call, to the calling station. Upon initiation of calling of the called machine, a call message S4 is sent from the called station to the network. Then, the network sends a call message S5 to the calling station.

When the called station sends a response message S6 for requesting or apprising the establishment of a communication path in response to the call establishment request, the network connects the called machine to the information channel B and sends a response message S7 to the calling station. In addition, the network sends a response confirmation message S8 to the called machine. When a communication path is established between the calling and called machines in this manner, Group 4 facsimile transmission S9 is carried out between the calling and called machines to thereby transmit image information from the calling machine to the called machine. Upon completion of transmission of image information, the calling machine sends a disconnection message S10, which requests to release the communication path, to the network. With this, the network sends a disconnection message S11 to the called machine. In response thereto, the called station sends a release message S12 for confirming the release of the communication path to the network. Thus, the network sends a release message S13 to the calling machine. As a result, the communication path between the calling and called machines is released. And then the calling machine sends a release completion message S14 to the network. With this, the network sends a release completion message S15 to the called machine. The call connection is thus completed.

With the above-described procedure, a communication path between the calling and called machines is established and the transmission of image information according to the Group 4 facsimile communication procedure is carried out, which is followed by the step of releasing of the communication path.

Figure 3:
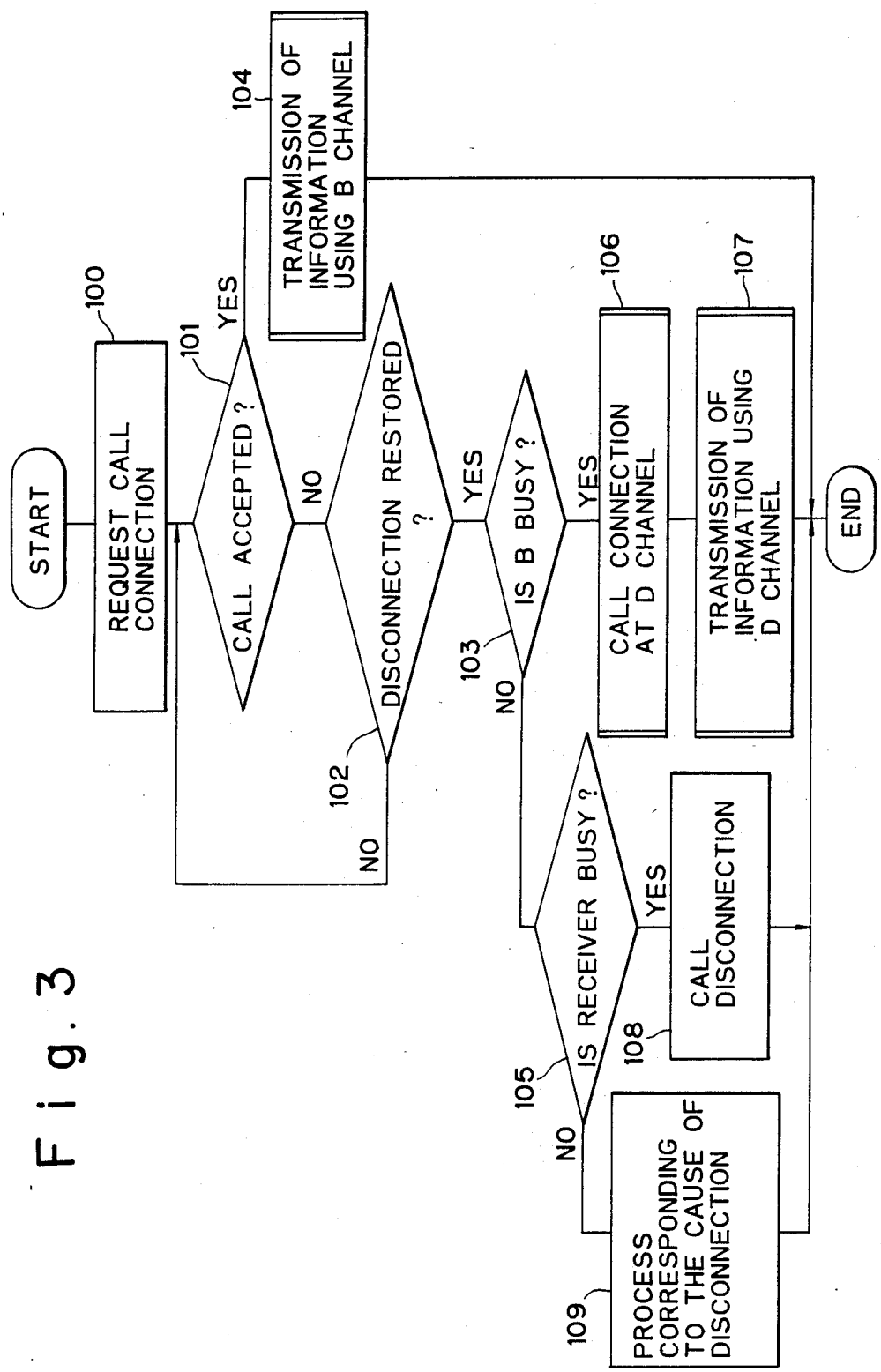
FIG. 3 is a flow chart showing one example of a procedure at the time of call establishment with the terminal apparatus shown in FIG. 1.

Now, in the case where the calling machine transmits image information to the called machine in such a procedure, a sequence of steps shown in FIG. 3 is implemented when requesting the establishment of a communication path with the called machine by sending the call establishment message S1 to the network.

In the first place, according to a survival control procedure (see CCITT recommendation I.430), the calling machine obtains the signal channel D and then sends a call establishment message S1, which contains such data as the kind of an information channel to be used, the type of transmission function and destination address (identification number of the called station), to the network using the signal channel D (step 100). In this case, if one or more of the two information channels B1 and B2 of the basic interface connected to the calling machine is unused, the network allocates one of them to the calling machine. And, if the designated destination is not busy, the network sends a call reception message designating the allocated information channel B1 or B2 to the calling machine. Other than that, the network sends a disconnection restoration message added with a reason parameter indicating the reason of disconnection to the calling machine.

Thus, the calling machine determines whether the message received from the network in response to the call establishment message S1 is the call reception message or the disconnection restoration message (steps 101 and 102), and if the result of the determination at step 101 is affirmative, transmission of information using the allocated information channel B1 or B2 is carried out (step 104). If the result of determination at step 102 is affirmative, the reason parameter is analyzed to thereby determine the cause of disconnection, i.e., whether it is because the information channels B1 and B2 are occupied or in use (closed) or it is because the destination station (called machine) is busy (step 103). If the result of determination at step 103 is affirmative, the call at the information channels B1 and B2 are once disconnected, and then, another call establishment message S1 is sent to the network by designating the signal channel D as an information channel (step 106). And then when this call is received and a communication path is established, transmission of information is carried out using the signal channel D as an information channel (step 107).

If the result of determination at step 105 is affirmative, the call is disconnected at that point in time (step 108), and it proceeds to a re-calling procedure. If the result of analysis of the reason parameter indicates neither the closure of the information channels nor the busy state of the destination station (i.e., the result of determination step 105 being negative), a process for dealing with the cause of disconnection corresponding to the result of analysis (i.e., step 109) is implemented and then it proceeds to the re-calling procedure.

As described above, in accordance with the principle of the present invention, if the information channels are occupied (closed) and the destination station (called machine) is not busy, transmission of information is carried out using the signal channel D as an information channel.

The signal channel D is shared by all of the terminal apparatuses connected to the same main interconnection bus MB (i.e., the signal channel D being a common resource), so that, according to the CCITT recommendations, there is a limit for the amount of data which can be transmitted by one transmission. That is, when a signal message is to be exchanged with the network, data of up to 128 bytes may be transmitted by one information transmission; whereas, when transmission information (packet) is to be exchanged, data of up to 256 bytes may be transmitted by one information transmission. Accordingly, even while one terminal apparatus is in the process of information transmission using the signal channel D as an information channel, another terminal apparatus connected to the same main interconnection bus MB may use this signal channel D.

Therefore, in accordance with the principle of the present invention, if all of the information channels B1 and B2 are occupied or in use, the remaining terminal apparatuses may use the signal channel D as an information channel so that the remaining terminal apparatuses may also carry out transmission of information even if both of the information channels B1 and B2 are in use (or closed). In this manner, in accordance with the principle of the present invention, as long as the destination station (called machine) is not busy, transmission of information can be carried out between calling and called terminal apparatuses.

However, in the mode of transmission of information using the signal channel D as an information channel, since the amount of data transmittable in one transmission and the transmission speed are significantly lower as compared with those of the information channels B1 and B2, it may be so structured that the signal channel D is designated as an information channel in the case of transmission of data small in amount and high in priority. That is, it may be so structured that the presence or absence of the designation of the function of the present invention is established depending on the kind of data to be transmitted or the like.

In the above-described embodiment, use has been made of a Group 4 facsimile machine as an ISDN terminal apparatus; however, the present invention is equally applicable to the case in which use is made of other types of ISDN terminal apparatuses. In addition, in the above-described embodiment, it has been described as to the case in which use is made of the ISDN basic interface; however, the present invention is equally applicable to the case in which use is made of any other interface, such as the ISDN primary group interface. Besides, in the above-described embodiment, use has been made of ISDN as the network; however, any other type of network, such as a private network using a private branch exchange, may also be used with the present invention.

As described above, in accordance with the principle of the present invention, when the information channels are all closed or in use, the signal channel commonly shared by a plurality of terminal apparatuses is used as an information channel to transmit data between the calling and called stations. Thus, even if all of the information channels are in use, the remaining terminal apparatuses can carry out transmission of information using the signal channel D temporarily as an information channel.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method of controlling a plurality of data terminal apparatuses connected to a bus type communication path in which a signal channel shared by said plurality of data terminal apparatuses for call connection with a network and at least one information channel are multiplexed, comprising the steps of:

a calling data terminal apparatus obtaining an access right to a signal channel;

requesting through the signal channel to a bus type communication path the establishment of a connection to a destination data terminal apparatus using an information channel;

alloting an empty information channel to the calling data terminal apparatus if one is empty;

sending a disconnection message to the calling data terminal apparatus if there is no empty information channel;

disconnecting the information channel connection and switching the signal channel to an information channel after the calling data terminal apparatus has received the disconnection message;

acknowledging the signal channel as an information channel and transmitting the information by the bus type communication path to the destination.

2. The method of claim 1 wherein there is an upper limit in the amount of information to be transmitted by one transmission when transmission of information is to be carried out using said signal channel as a switched information channel.

3. The method of claim 1 wherein said signal channel is temporarily designated as an information channel depending on the kind of information to be transmitted.

* * * * *